ROOF RIDGE VENTILATOR

Original Filed Aug. 2, 1960 2 Sheets-Sheet 1

INVENTOR.
Lester L. Smith
BY
Horton, Davis, Brewer and Brugman
Attorneys

ROOF RIDGE VENTILATOR

Original Filed Aug. 2, 1960 2 Sheets-Sheet 2

INVENTOR.
Lester L. Smith
BY
Horton, Davis, Brewer & Brugman
Attorneys

United States Patent Office

Re. 25,921
Reissued Nov. 30, 1965

25,921
ROOF RIDGE VENTILATOR

Lester L. Smith, Peoria, Ill.
(P.O. Box 68, Princeville, Ill.)

Original No. 3,079,853, dated Mar. 5, 1963, Ser. No. 46,968, Aug. 2, 1960. Application for reissue Feb. 23, 1965, Ser. No. 454,228
7 Claims. (Cl. 98—42)

Matter enclosed in heavy brackets [ ] appears in the original patent but forms no part of this reissue specification; matter printed in italics indicates the additions made by reissue.

This invention relates to roof ridge ventilators, and more paricularly to ventilators which extend along the ridge of a roof and provide for movements of air to and from the space below the roof, while affording good protection from weather, including driven rain, snow and the like.

The ventilator structures disclosed herein embody improvements over those shown in my copending application, Serial No. 795,863, filed February 26, 1959, for Roof Ventilators, in which application, Frank E. Randall is a co-inventor.

It has been found that in some buildings, such as smaller one story dwellings built on concrete slabs without basements and having the heating plants located in the living quarters, usually at a generally central position, the amount of air required to burn the fuel for heating in very cold weather is sometimes sufficient to effect a tendency toward reduced atmospheric pressure in the space between the room ceilings and the roof. The resultant inward movement of air through a ventilator, when accompanied by wind driven snow, brings about the desirability for the additional weather protection afforded by means, such as a baffle, for effecting deflection and change of direction of the flow of air to the lowered openings external to the ventilator.

One of the objects of my invention is to provide a roof ridge ventilator made of formed sheet metal and adapted to extend longitudinally of the roof ridge with integral flashing for overlapping the roof shingles and having marginal portions thereof formed to provide improved rigidity and edge sealing properties.

As another object, this invention has within its purview the provision of a roof ridge ventilator including louvered openings at a sheltered position in the ventilator for the flow of air therethrough and having baffle means spaced from the louvered openings for deflecting driven snow and rain in a manner to improve the weather protective qualities of the ventilator.

Other objects and advantages of the invention will be apparent from the following description taken in conjunction with the accompanying drawings in which.

Figure 1:
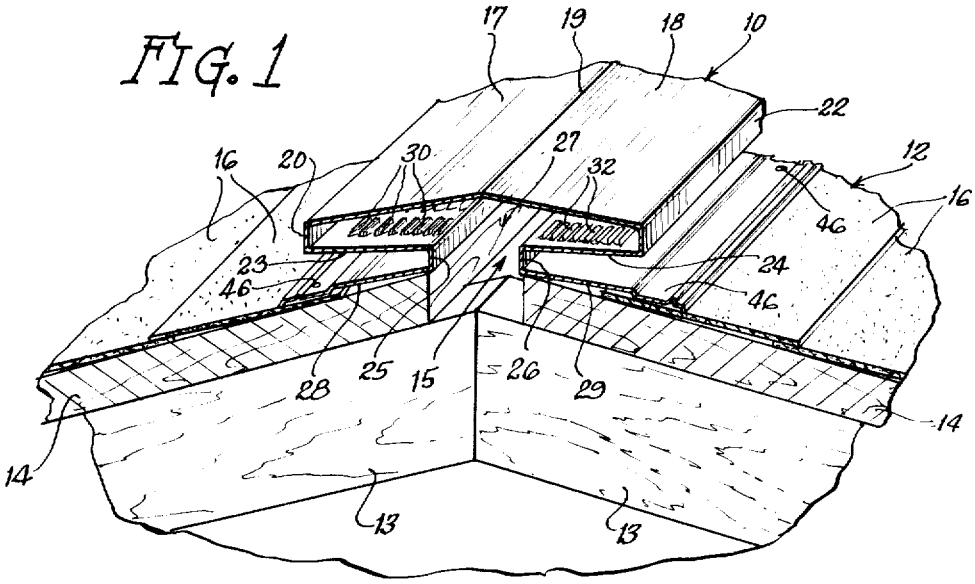
FIG. 1 is a fragmentary perspective view of a roof ridge ventilator embodying a preferred form of this invention and shown in an adaptation to the roof of a building.
Figure 2:
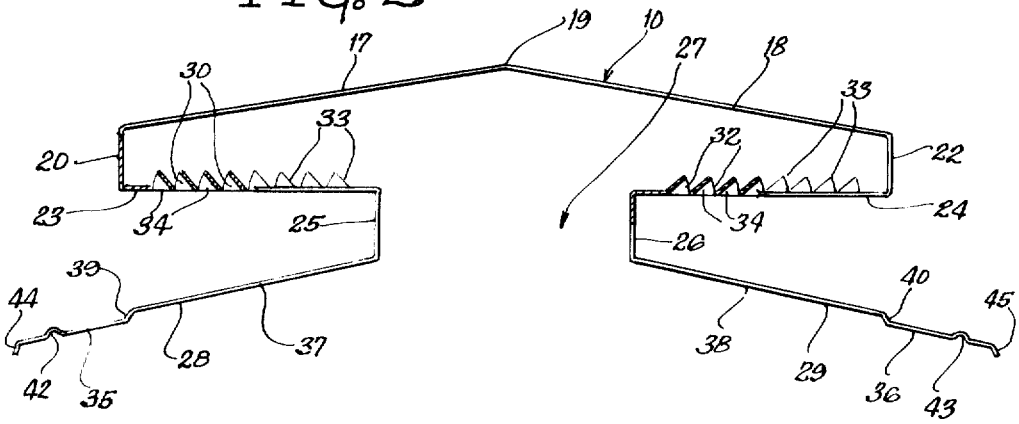
FIG. 2 is an end elevational view of the roof ridge ventilator depicted in FIG. 1.
Figure 3:
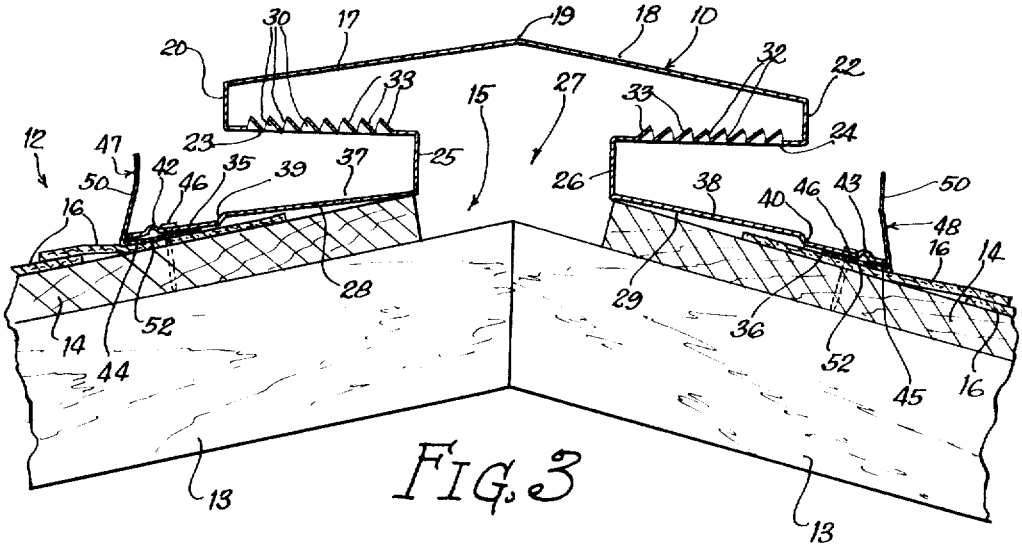
FIG. 3 is a fragmentary end elevational view of the roof ridge ventilator of FIG. 1 shown in an application to the roof of a building and including baffle means of a type adapted to afford added weather protection in some installations.

In the exemplary embodiments of my invention which are shown herein for illustrative purposes, a roof ridge ventilator 10 has a sectional shape which is symmetrical with respect to a longitudinal central plane and is adapted to mounting on the ridge of a building roof 12, as shown in FIGS. 1 and 3 with the ventilator extending longitudinally of the roof ridge. In the illustrated building structure, rafters 13 support roof sheathing 14 which is secured thereto. At the ridge of the roof, a space 15 is left between the sheathing on the two sides of the roof ridge to provide for the flow of air through the ventilator 10 and the roof. As may be observed in FIGS. 1 and 3, the illustrated ridge ventilator 10 replaces the usual ridge row of shingles, and roofing materials, such as shingles 16 on the two sides of the roof, extend to positions overlying the roof ventilator and approaching the space 15 between the sheathing on the two sides.

The disclosed ridge ventilators 10 have top or cover portions 17 and 18 which extend outwardly in symmetrical and obtuse angular relationship to one another on opposite sides of a ridge bend 19 on opposite sides of the ventilator. Outer side walls 20 and 22 extend downwardly from the top or cover portions 17 and 18 respectively. Panels 23 and 24 extend inwardly from the bottoms of the outer side walls 20 and 22 respectively in spaced and opposed relationship to the top or cover portions 17 and 18 of the ventilator. Inner side walls 25 and 26 extend downwardly in spaced and substantially parallel and opposed relationship to one another from the inner edges of the panels 23 and 24 respectively to define a throat 27 for the passage of air therebetween. From the bottom edges of the inner side walls 25 and 26, flashing portions 28 and 29 of the ventilator extend outwardly in angular relationship to one another and in spaced and opposed relationship to the panels 23 and 24 respectively. In the disclosed structure, the flashing portions 28 and 29 extend laterally of the ventilator structor to positions beyond and downward from the outer side walls 20 and 22 and the panels 23 and 24 of the ventilator.

Rows of louvered vent openings 30 and 32 are provided in the panels 23 and 24 respectively, which louvered vent openings are relatively small in both length and width and are repeated in spaced relationship to one another longitudinally of the panels of the ventilator. In order to provide optimum weather protection, louvers 33 are integrally formed in the respective panels to extend upwardly from the panels and into the ventilator over their respective openings 34 with the slopes of the louvers on each side of the ventilator structure being outward toward the outer side walls 20 and 22 of the ventilator. Being thus disposed, air moving into the ventilator is required to change its direction both externally and internally of the ventilator, whereupon moisture is removed from the air in each change of the direction of air movement. Also, with this arrangement of louvered vents, moisture removed from the air internally of the ventilator at the panels 23 and 24 is drained from the interior of the ventilator through the openings 34. This structure affords good weather protection in most instances, and provides for the movement of relatively dry air through the throat 27 between the inner side walls 25 and 26 of the ventilator.

In order to provide a defined nailing strip at the outer margins of the flashing portions of the ventilator, to insure a tight seal between the ventilator flashing portions and the shingles or roofing which underlies the flashing portions as well as to rigidify the margins of the flashing portions and provide an accommodation for a sealing flange on a plastic plug used to close the ends of the ventilator, as well as to join adjacent sections of a long ventilator, the flashing portions 28 and 29 include outer marginal portions 35 and 36 respectively which are offset from inner portions 37 and 38 of the flashing portions by integral angularly disposed intervening portions 39 and 40 respectively. Integrally formed stiffening beads 42 and 43 of generally semi-circular shape extend along the outer marginal portions 35 and 36 between the intervening portions 39 and 40 and the outer edges of the outer marginal portions. Also to rigidify the edges of the outer marginal portions of the flashing portions, narrow marginal flanges 44 and 45 are provided which extend downwardly in angular relationship to the outer marginal portions 35 and 36 for engagement with overlapped roofing material, as depicted in FIGS. 1 and 3. For fastening the ventilator in place on a roof, as shown in FIGS. 1 and 3, fastening means such as nails 46 are utilized, which nails extend through outer marginal portions 35 and 36 adjacent and inside of the stiffening beads 42 and 43.

As shown in FIGS. 1 and 3, the space 15 between the sheathing 14 on the two sides of the roof is at least as wide as throat 27 between the inner side walls 25 and 26 of the ventilator, so that the sheathing does not restrict the flow of air through the throat. Also, the combined area of the vent openings 34 and the spaces between the parts of the ventilator structure, such as the panels 23 and 24 and the cover or top portions 17 and 18 are calculated to afford air flow commensurate with that afforded by the throat.

In order to provide weather protection suited to extremely severe conditions, as where high winds are prevalent to drive rain or snow, as well as to counteract the effect of reduced pressure within a building resulting from the demands for air for the combustion of fuel in a heating system within the building, it is sometimes desirable to utilize additional means for controlling and directing the flow of air to the louvered vent openings on the outside of the ventilator. For this purpose, as shown in FIGS. 3 and 5, I have provided baffles 47 and 48 of one type in the structure of FIG. 3 and baffles such as 49 of another type, as shown in the modified structure of FIG. 4, which extend upwardly from the outer edges of the flashing portions 28 and 29 of the ventilator. Since the flashing portions 28 and 29 of the disclosed ventilator are wider than the top or cover portions 17 and 18, baffles 47, 48 and 49 extend upwardly to heights below, but near the level of the panels 23 and 24, so that they do not unduly restrict the flow of air to the louvered openings, but so that they insure that air flowing to the louvered openings must change direction after passing the baffles in order to pass through the louvered openings.

Figure 4:
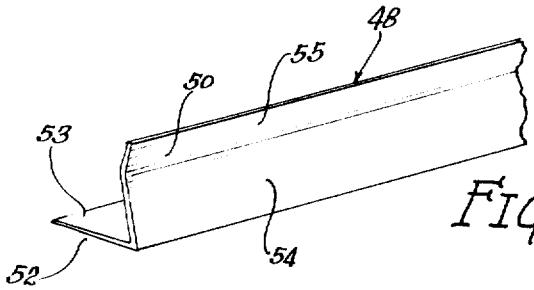
FIG. 4 is a fragmentary perspective view of a preferred form of baffled structure adapted to use as illustrated in FIG. 3.
Figure 5:
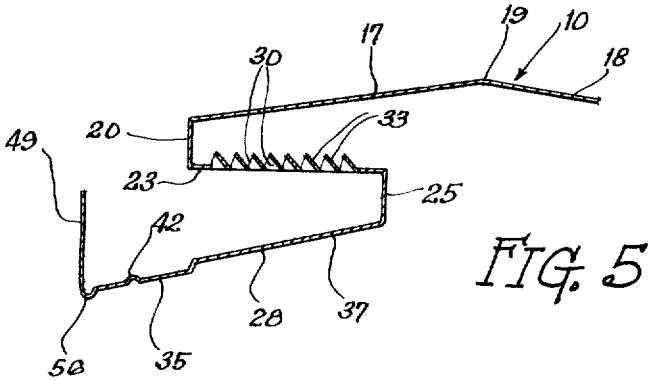
FIG. 5 is a fragmentary end sectional view of a modified form of my roof ridge ventilator wherein the baffle means for affording added weather protection is made as an inetgral part of the ventilator.

In the structure illustrated in FIGS. 3 and 4, the baffles 47 and 48 are made as separate pieces from a material, such as an extruded plastic section with side flange portions 50 and 52 in angular relationship to one another. In the form disclosed, the flange portion 52 is tapered to a thinner section toward its free edge 53 and serves as a base for supporting the flange portion 50 in an upright position when the flange portion 52 is overlapped by the outer marginal portion of one of the flashing portions. For affording added rigidity and providing desired air deflecting characteristics, a lower portion 54 of the side flange portion 50 is disposed in acute angular relationship to the flange portion 52, while an upper marginal portion 55 of the side flange portion 50 extends outwardly in obtuse angular relationship to the lower portion 54. When mounted with the side flange portion 52 overlapped by the outer marginal portions of the flashing portions of the ventilator, the baffles are secured in position by the nails 46 which extend through the side portions 52 and are engaged at the apex of the angularly disposed side portions by the edges of the narrow marginal flanges 44 and 45 on the flashing portions. Being in lengths commensurate with the lengths of the ventilator structure, the baffles extend therealong, except that at the ends of the ventilator and at positions in which sections of the ventilator are put together, and where there are no louvered vent openings, small gaps may be provided in the side flange portions 50 to permit the drainage of any water which may collect on the inside of the baffles.

In the modified structure illustrated in FIG. 5, the narrow flange at the outer edge of the flashing portion 28 is extended into a bead 56 of generally semi-circular section with the curvature reversed with respect to that of the bead 42, and the baffle 49 extends upwardly as an inetgral continuation of the outer edge of the bead 56. Except for being integrally formed and made of metal, the general purposes and characteristics of the baffle 49 are similar to those described with respect to the baffles 47 and 48.

From the foregoing description and by reference to the accompanying drawings it may be understood that I have provided a roof ridge ventilator structure having improved means for rigidifying and effecting good sealing for the outer marginal portions of the flashing portions of the ventilator, and have also provided improved weather protection in the form of baffles which suits the ventilator to extreme weather and service conditions by necessitating the change of direction of the flow of air to the louvered vent openings at the exterior of the ventilator structure.

Having thus described my invention, what is claimed is:

1. A roof ridge ventilator comprising, in combination, a top cover part having side portions extending laterally from a longitudinal ridge in angular relationship to one another, outer side walls extending downwardly from the top portions, panels narrower than the side portions of the top cover part extending inwardly from said outer side walls in spaced relationship to the side portions of the top part and facing downwardly, inner side walls extending downwardly from the panels in spaced and opposed relationship to one another and defining a central open throat therebetween which serves as an air flow passage, side flashing portions extending laterally in opposed relationship to one another from the bottoms of the inner side walls, said panels having openings therein and louvers thereon which extend upwardly and outwardly of the panels over each of said openings, said side flashing portions extending laterally beyond the panels and outer side walls and having outer marginal nailing portions extending longitudinally thereof and offset from the general planes of the flashing portions, said marginal nailing portions of the flashing portions having stiffening beads formed therein and extending longitudinally thereof near the outer edges of the flashing portions, narrow outer marginal portions of said flashing portions outwardly of the stiffening beads bent to extend downwardly in obtuse angular relationship to the flashing portions to provide relatively stiff and thin roof engaging edges, and means providing baffles extending upwardly from outer edge regions of said flashing portions spaced outwardly from said outer side walls and terminating below the level of said ridge of the ventilator to deflect wind driven rain and snow from being driven directly across the flashing portions toward said inner side walls and the louvered openings in said panels.

2. A roof ridge ventilator as defined in claim 1, and wherein said baffles comprise flanges integral with said flashing portions.

3. A roof ridge ventilator as defined in claim 1, and wherein said means each comprise angle strips having flange portions in angular relationship to one another, one of said flange portions of each angle strip underlying said marginal nailing portion of each flashing portion, and the other side portion of each angle strip extending upwardly in angular relationship to the outer edge of each flashing portion to provide said baffle.

4. A roof ridge ventilator comprising, in combination, a top cover part having side portions extending laterally from a longitudinal ridge in angular relationship to one another, outer side walls extending downwardly from the top portions, panels narrower than the side portions of the top cover part extending inwardly from said outer side walls in spaced relationship to the side portions of the top part and facing downwardly, inner side walls extending downwardly from the panels in spaced and opposed relationship to one another and defining a central open throat therebetween which serves as an air flow passage, side flashing portions extending laterally in opposed relationship to one another from the bottoms of the inner side walls, said panels having louvered openings therein, said side flashing portions extending laterally beyond the panels and outer side walls, and means providing baffles extending upwardly from said flashing portions at positions spaced outwardly of the ventilator from said outer side walls thereof to deflect wind driven rain and snow from movement directly across the flashing portions toward said inner side walls and the louvered openings in the panels.

5. A roof ridge ventilator as defined in claim 4, and wherein said baffles comprise flanges which are integral with said flashing portions.

6. A roof ridge ventilator as defined in claim 4, and wherein said means includes angle strips extending along the outer edges of said flashing portions and having flange portions in angular relationship to one another, and one flange portion of each angle strip underlying an outer margin of each flashing portion.

*7. A roof ridge ventilator comprising a top cover means, a panel facing downwardly from the cover means in spaced and opposed relationship thereto so as to be sheltered*

*thereby, said panel having ventilating openings therein, side wall means joining an outer lateral part of said cover means to an outer lateral part of said panel, lower wall means defining a passage between the bottom of the ventilator and the space between the panel and cover means, said lower wall means being adjoined at its upper regions to the panel, flashing means adjoined to the lower regions of the lower wall means and extending outwardly beyond said panel, and a baffle extending upwardly from said flashing means at a position spaced laterally outwardly from said panel and to a height near the level of said panel such that air flowing to the ventilating openings must change direction after passing the baffle.*

References Cited by the Examiner

The following references, cited by the Examiner, are of record in the patented file of this patent or in the original patent.

UNITED STATES PATENTS

| | | | |
|---|---|---|---|
| 2,157,609 | 5/1939 | Hopkins | 98—19 X |
| 2,365,328 | 12/1944 | Bell | 98—18 X |
| 2,704,500 | 3/1955 | Bonforte | 98—42.1 |
| 2,868,104 | 1/1959 | Honholt | 98—42.1 |
| 2,895,399 | 7/1959 | O'Hea | 98—42.1 |

WILLIAM F. O'DEA, *Primary Examiner.*

JOHN F. O'CONNOR, *Examiner.*